Aug. 27, 1940.   F. L. WOLFF   2,212,803
AUTOMATIC CLUTCH CONTROL
Filed July 27, 1939   4 Sheets-Sheet 1
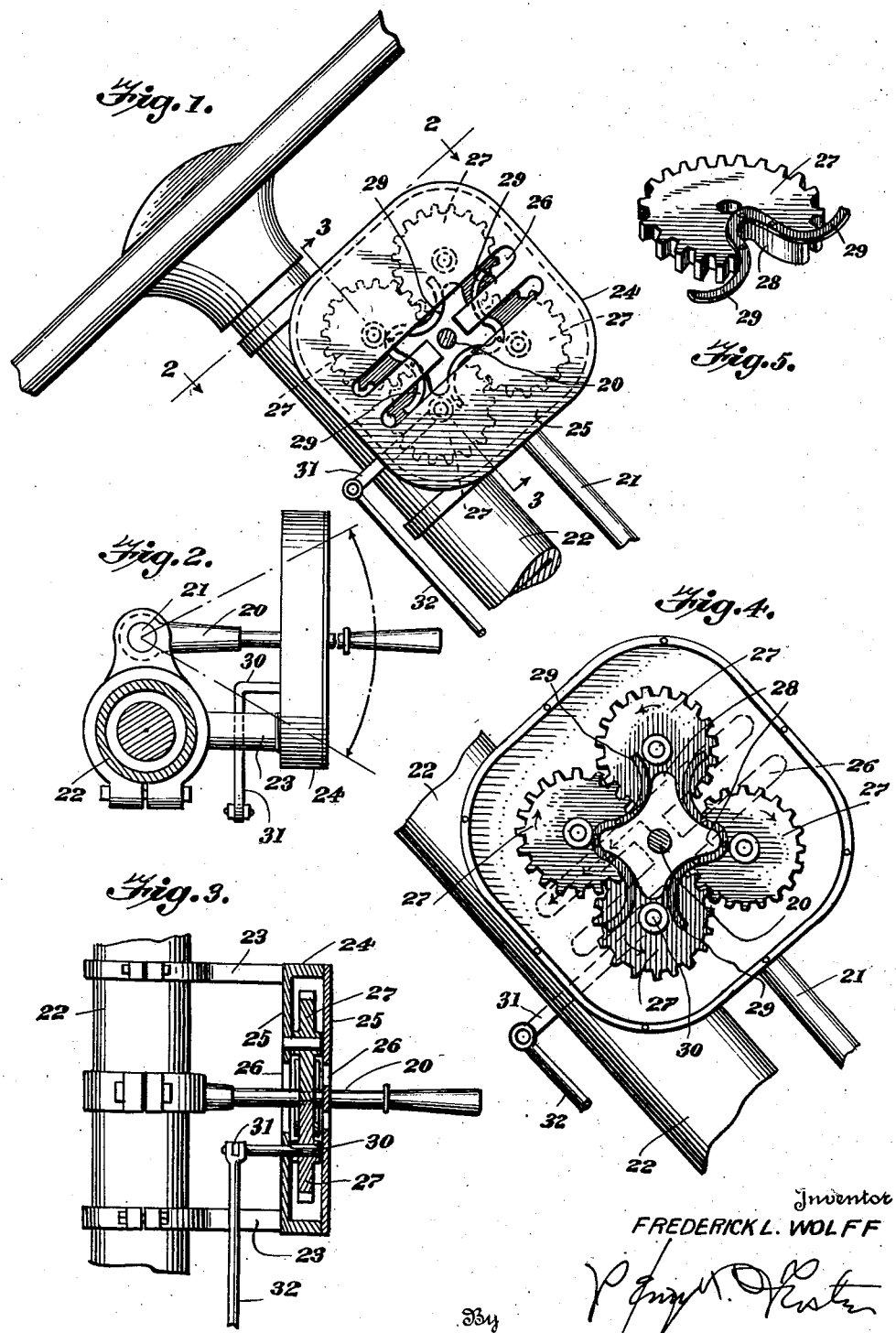
Inventor
FREDERICK L. WOLFF

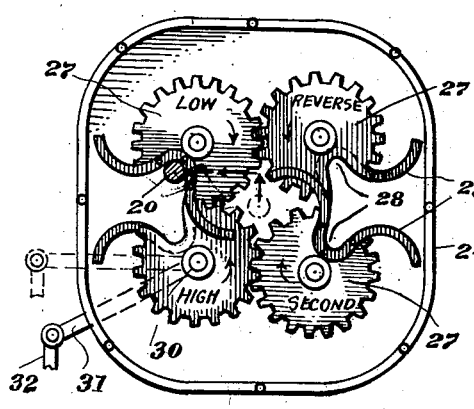
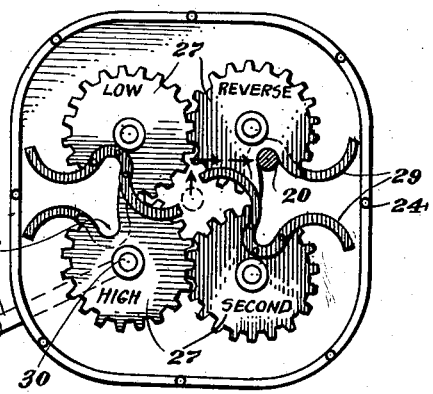
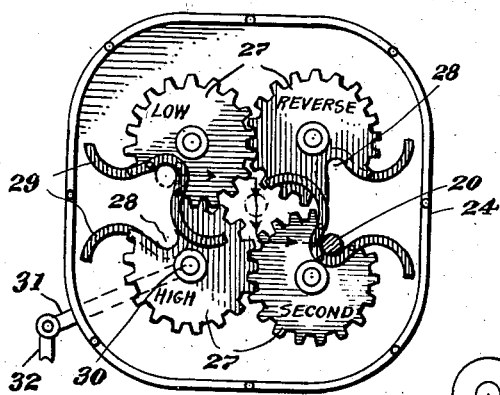
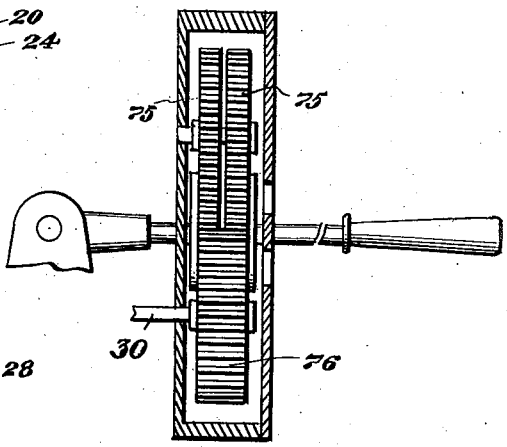
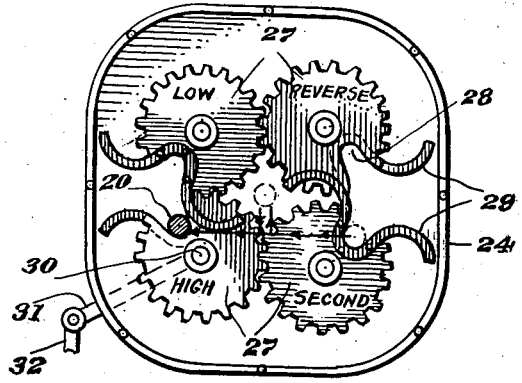

Aug. 27, 1940.                F. L. WOLFF                 2,212,803
                        AUTOMATIC CLUTCH CONTROL
                        Filed July 27, 1939        4 Sheets-Sheet 3
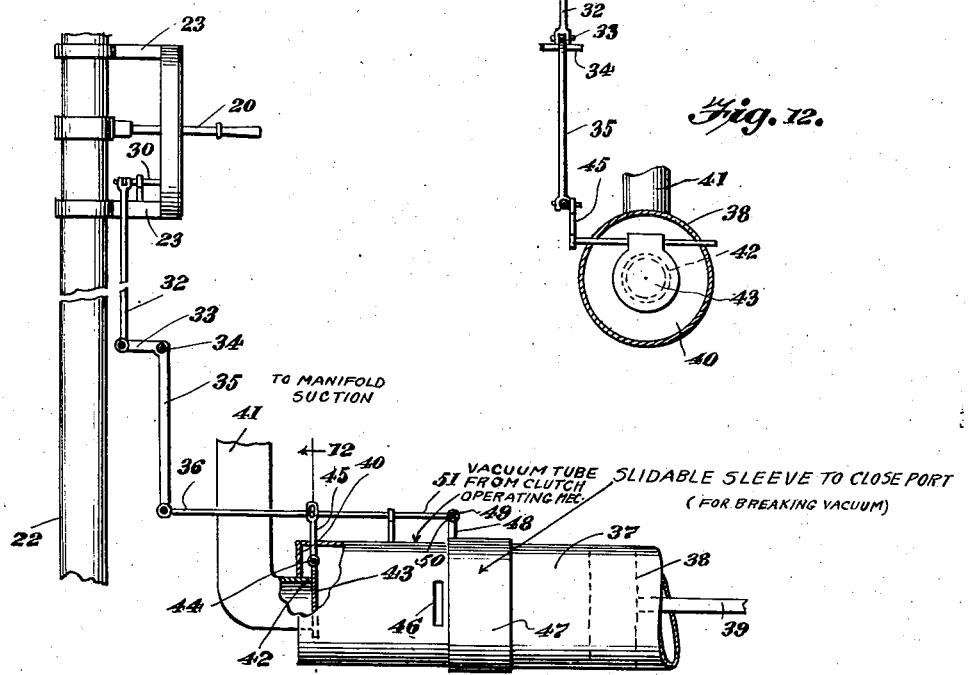
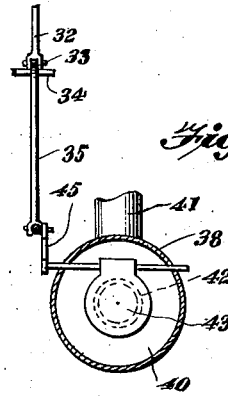
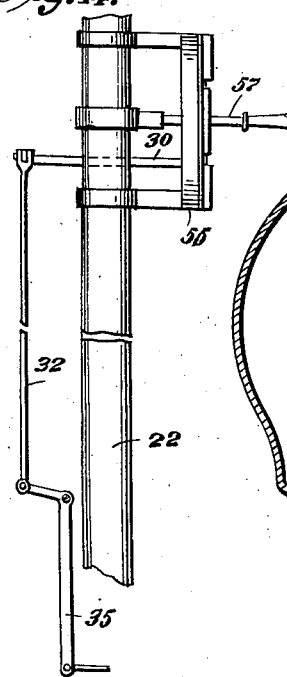
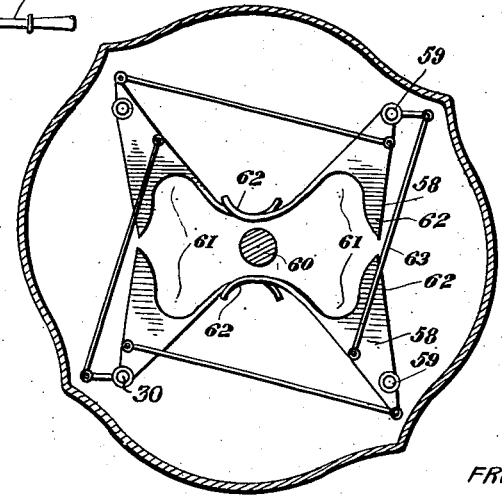
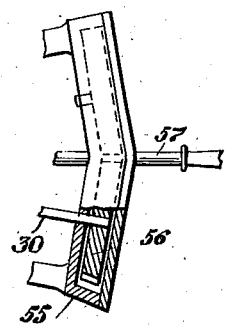
Inventor
FREDERICK L. WOLFF Aug. 27, 1940.  F. L. WOLFF  2,212,803
AUTOMATIC CLUTCH CONTROL
Filed July 27, 1939  4 Sheets-Sheet 4
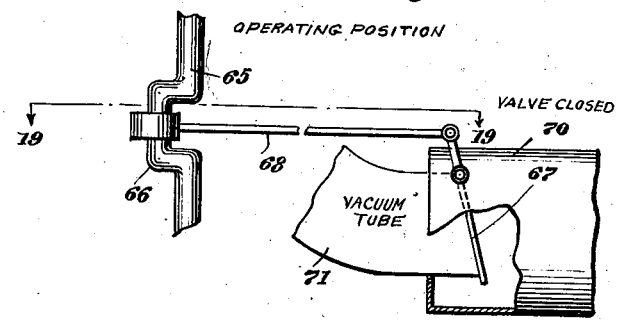
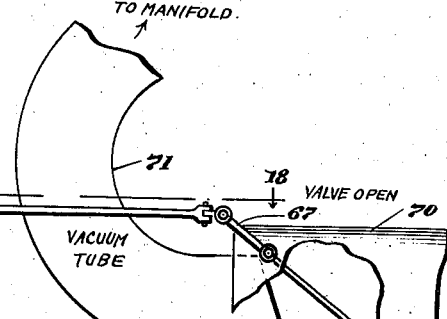
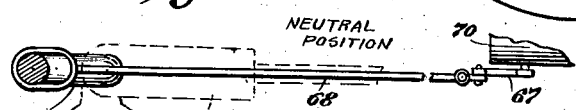
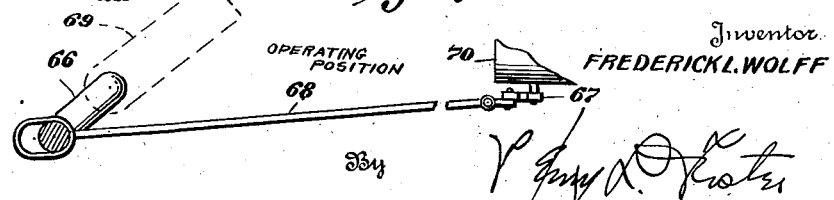
Inventor
FREDERICK L. WOLFF Patented Aug. 27, 1940

2,212,803

UNITED STATES PATENT OFFICE 2,212,803

AUTOMATIC CLUTCH CONTROL

Frederick L. Wolff, Omaha, Nebr.

Application July 27, 1939, Serial No. 286,887

17 Claims. (Cl. 192—3.5)

This invention relates to automatic clutch controls particularly for use with automobile transmission systems, but usable in any power-transmitting mechanism that includes change speed gearing having a selecting controller that is movable to different positions to establish different drives through the transmission, and a clutch, the engagement of which is controlled by a power-operated controller.

The primary object of the invention is to provide novel means in association with the manually operated selecting member of the transmission for controlling the actuation of the power clutch-operator.

Another object is to provide a novel system by means of which the clutch-operator is automatically actuated by the movement of the gear selector to a drive-establishing position to engage the clutch and to disengage the clutch when the selector is moved away from a drive-establishing position.

Another object is to provide a novel actuating device for association with a gear selector such as a standard type shifting lever that will be automatically operated by the movement of the lever to and from drive-establishing positions.

Still another object is to provide such an actuating mechanism in which motion of the lever to any one of the different positions for establishing a drive will result in the same motion of the mechanism.

A further object is to provide a novel form of movable element for engagement by the shifting lever to be moved thereby.

In the accompanying drawings:

Figure 1 is an elevation showing the actuating mechanism mounted in association with a standard type gear shift control that is mounted on the steering column of an automobile;

Figure 2 is a sectional view on line 2—2 of Figure 1;

Figure 3 is a sectional view on line 3—3 of Figure 1;

Figure 4 is an enlarged elevation showing the operating parts of the mechanism;

Figure 5 is a perspective view of one of the actuating elements;

Figures 6 to 9 are diagrammatic views showing the various paths of the gear shift lever in moving to the various drive-establishing positions and indicating the positions to which the actuating elements move;

Figure 10 is a transverse sectional view of an actuating mechanism having modified elements;

Figure 11 is a diagrammatic view illustrating the association of the actuating mechanism with a clutch controller;

Figure 12 is a sectional view on line 12—12 of Figure 11;

Figure 13 is an elevation partly in section showing a slightly modified actuating assembly;

Figure 14 is a diagrammatic illustration of the use of such an assembly;

Figure 15 is a plan view of a modified actuating mechanism;

Figure 16 is a diagrammatic view showing a modified form of actuating mechanism for a clutch controller;

Figure 17 is a fragmentary view illustrating the operation of such actuater;

Figure 18 is a sectional view on line 18—18 of Figure 16; and

Figure 19 is a sectional view on line 19—19 of Figure 17.

Describing the drawings more particularly, a gear shift lever is indicated at 20, such lever being mounted on the end of a gear-shifting rod 21 that extends from the transmission of the automobile along the forward side of the steering column 22 and through which motion of the lever 20 is carried to the transmission for controlling the drive to the various gears. Surrounding a portion of the lever 20 and mounted on brackets 23 is a casing 24 having inner and outer side walls 25 provided with slots 26 through which the lever extends and which permit the lever to travel along paths that form an H-shaped figure in the well known manner.

The casing 24 encloses a group of actuating elements which in this case comprise gear wheels 27 rotatably journalled within the casing and having their centers located to the outside of the arms of the H-shaped opening 26 and centrally of the ends of such opening. Each of the gear wheel members 27 is provided with a notch 28 that is of such size and shape as to receive the lever 20 as it moves from the central or neutral position along one of the arms of the opening 26. When the lever is so moved, it enters the notch 28 of one of the wheels and thereafter its continued motion serves to turn the wheel, moving the notched portion outward and along the arm of the opening.

The gear wheels are of such size and so arranged that they intermesh so that the motion imparted to one of them by the lever is transferred to all of them. While all of the adjacent wheels 27 may be meshed, it is preferable that one adjacent pair be out of mesh as illustrated in the drawings since this permits some variation in the relative positions of the wheels without danger of jamming or difficult operation by reason of excess friction.

It will be noted, particularly with reference to Figure 4, that the adjacent gear wheels meeting at the ends of the cross reach of the H-shaped path described by the lever 20 present a recess by reason of the curvature of such wheels.

In order to prevent the lever entering this recess and to provide for its positioning the wheels properly as it is moved across the central reach of the path as well as to insure proper motion of the wheels as the lever travels toward the neutral position from one of the drive-establishing positions, lever-engaging members 29 are mounted on the surfaces of the respective wheels. These members 29 constitute curved mental arms that extend from the edges of the notches beyond the peripheries of the wheels and toward the neutral position. Referring to Figure 1, it will be seen that movement of the lever 20 to one or the other ends of the central reach will result in its engaging the members 29 that extend across the recess between the wheels. Should the wheels be so turned that the members 29 lie towards the center and within the positions in which they are illustrated, this movement of the lever will serve to turn the wheels, thereby setting them in the positions in which they are illustrated in Figures 1 and 2. Motion of the lever from this point to one of the drive-establishing positions will result in entry of the lever into the notch 28 and thereafter the wheel with which the lever is engaged will be moved, turning all of the wheels as above described.

It will be noted that the engaging members 29 are mounted upon both sides of the notches 28. This duplication is to permit any of the wheels 27 to be mounted in any position. Since the engaging members are mounted on the surfaces of the wheels, alternate wheels are mounted in the assembly in reverse positions so that the members 29 occur on the upper and lower surfaces respectively of the adjacent wheels, thus providing for clearance, and the double character of the members permits a wheel to be mounted in either position.

A shaft 30 extends from the center of one of the wheels 27 through the rear wall 26 of the casing and toward the steering column 22. The end of this shaft is provided with a crank 31 that turns as the system of wheels is turned by the movement of the lever 20 in engagement with any one of them. Connected with the crank 31 is an operating link 32 that is sufficiently strong to be in effect a rigid bar. This operating link extends downwardly along the steering column to a point below the floor of the body of the automobile where it is connected to one arm 33 of the bell crank 34, the other arm 35 of which is connected to a reciprocable operating rod 36.

Mounted on the chassis of the automobile is a clutch controller comprising a cylinder 37 provided with a piston 38 having a rod 39 connected by a suitable mechanism with the clutch in such manner that when the piston is drawn toward the end 40 of the cylinder the clutch will be disengaged. The interior of the cylinder is connected by a tubular member 41 with the intake manifold of the engine which acts as a source of vacuum for actuating the piston. The tubular member 41 extends through the end wall 40 of the piston and its end provides a valve seat 42 that is controlled by a damper-type valve 43 pivoted to the cylinder at 44 to swing between open and closed positions and provided with an operating stem 45 extending beyond the cylinder and connected with the operating rod 36 which extends along and parallel to the axis of the cylinder. It is preferable to pivot the valve above the seat as shown, since it will have a tendency to swing to closed position by gravity.

When the lever 20 is shifted from the neutral position to one of the driving positions, for example, as indicated in Figure 6, the system of wheels is moved to the position shown in that figure and this motion, the direction of which is indicated by the arrows, is transmitted by the shaft 30 to the crank 31 which as shown in Figure 6 is lowered from the position shown in dotted lines. The motion of the crank lowers the rod 32 and swings the bell crank 34, moving the operating rod longitudinally of the cylinder and to the position shown in Figure 11 which motion has the effect of closing the valve 43 against the seat 42, thereby cutting off the cylinder from the source of vacuum. This permits the piston 38 to move in the direction away from the end 40 of the cylinder and the clutch that is connected with the piston is permitted to become engaged.

The effect of this will be readily understood. When the lever 20 is moved from neutral to driving position, the clutch will be automatically engaged and the automobile will start moving, it being of course understood that the parts are so arranged and related that the piston is not permitted to move to engage the clutch until the gear-shifting lever 20 has reached the drive-establishing position and the drive has been established.

The shifting of the gears from one drive to another is accomplished by moving the shifting lever 20 in appropriate fashion; thus in Figure 7 the path from first to second is illustrated by the dotted arrows. As the lever 20 moves along this path, the first effect will be to turn the wheel 27 with which it is engaged in a counterclockwise direction which occurs as the lever is moving from the first position toward neutral. The mechanism comprising the wheels 27 and the linkage through which the valve 43 is controlled are so arranged that the valve 43 is opened immediately the lever is moved. As soon as the valve is opened and vacuum is permitted to act upon the piston 38, the latter is drawn inwardly toward the end wall 40 and the clutch is disengaged.

As the lever 20 moves along toward the neutral position, it will reach a point at which it becomes disengaged from the notch 28 of the wheel. The engaging members 29 are so curved as to constitute a bearing surface against which the lever 20 will thrust during the remainder of its travel toward the neutral position and this will insure that the wheels are turned to the full neutral position in which they will be ready for the next operation.

Referring further to Figure 11, it will be seen that the wall of the cylinder 37 is provided with a port 46, located between the end wall 40 of the cylinder and the piston when the latter is in its innermost position. A sleeve 47 slidably surrounds the cylinder and is movable to cover and uncover the port. The sleeve 47 has a lug 48 carrying a pin 49 that engages in a slot 50 in an extension 51 of the operating rod 36. These parts are so arranged that when the valve 43 is closed, the port 46 is opened to vent the cylinder, breaking the vacuum and permitting the piston to move outwardly and thereby permitting engagement of the clutch.

It will be understood that a large variety of supplemental controls may be provided for the piston, as for example, to provide for a smooth engagement of the clutch, and a proper timing of the engagement.

In Figures 13 and 14, a modified arrangement of operating mechanism is illustrated. The casing 55 is formed in the shape of a wide V, and the peripheries of the gear wheels are bevelled to permit them to mesh while conforming to the arrangement of the casing. The neutral position is at the apex of the V, the wings of which extend in directions to embrace the steering column. Such an arrangement provides for a compact and out of the way assembly when mounted on the steering column. The angular arrangement of the wheels may be utilized to lead the extending operating shaft to the left side of the steering column as illustrated in Figure 14.

In Figure 15, the movable elements are shown as comprising plate members 58, pivoted at 59 to swing along planes that are substantially at right angles to the axis of the lever 60. One of the plates 58, preferably the lower left one as viewed from the face of the assembly, is mounted on the operating rod 30 of the clutch actuating mechanism, for turning the same as the plate swings. The plates are provided with recesses 61 that correspond to the notches in the gear wheels described above, and which receive the lever 60 as it moves toward a drive-establishing position. Rearwardly of the recesses 61 are projections 62 that are engaged by the lever as it moves toward the drive-establishing positions and by which the plates 58 respectively are turned to actuate the clutch controller. Forwardly of the recesses 61 are engaging members 62 that are curved away from the recesses for continued engagement by the lever after it leaves the recess of one of the members in travelling toward neutral position.

The plates 58 are interconnected by three (or, permissibly, four) connecting rods 63 so arranged in relation to their respective pivots that adjacent plates are moved in opposite directions. In this manner movement of the lever 60 to the different drive-establishing positions will result in motion of the respective plates in the same direction, regardless of the side to which the lever is moved from neutral position, thereby permitting uniformity of operation by the actuating mechanism.

Figures 16 to 19 illustrate a simplified form of actuating mechanism for the clutch controller. In this embodiment of the invention, the gear shifting shaft 65 is provided at a point adjacent the clutch controller with a crank 66, so arranged with relation to the valve 67, with which it is connected by a link 68, and the shifting lever 69, that when the latter is in any of the driving positions, as shown in Figures 17 and 18, the valve 67 will be closed. When the handle 69 is moved from one of the drive-establishing positions, the crank will move the link 68 in the direction that opens the valve to connect the source of vacuum with the cylinder 70. To accomplish these results the crank is arranged to swing past dead center as the handle 69 passes its most central position, and the link 68 and valve 67 are so related that the latter is closed when the handle 69 has swung sufficiently to one side of dead center to have established the drive through the transmission.

Figure 10 illustrates an actuating mechanism of the general type of that disclosed by Figures 1 to 9, but having a modified arrangement of gear wheels. In this arrangement, two of the gear wheels 75 are of slightly less than one-half the thickness of the two other gear wheels 76. The wheels 76 are mounted adjacent and mesh with each other and each of them meshes with one of the thin wheels 75, which occupy adjacent positions, but are laterally spaced so as to avoid contact. This arrangement permits the centers of the wheels to be arranged at the corners of a square that surrounds the gear-shifting handle without necessitating that all of the wheels mesh, thereby avoiding the difficult operation that may result in a completely intermeshing chain of gears.

The operation of the invention herein described, and its advantages, will be readily understood and appreciated. The control of the clutch automatically in relation to the operation of the gear-shifting member relieves the operator of the necessity of exerting manual control over the clutch, and the mental attention necessary to such manual control, thereby simplifying driving the automobile to a great extent.

The control of the clutch from the manually operated gear-shifting member, as distinguished from clutch control by the operation of the accelerator, brake, etc., has the advantage that the engagement of the clutch is under the control of the operator and retains the braking power of the engine, since the driving connection between the engine and wheels is effective so long as the gear-shifting member is in a drive-establishing position.

The mechanical arrangements of the systems herein disclosed are also advantageous from a practical point of view. There are no flexible or yielding elements such as cables employed, but a positive actuating system connects the manual gear-shifting member with the clutch-controlling valve. Since the controlling cylinder, and the valve that governs its actuation are both mounted on the chassis, there is no need for flexible tubes, or other members subject to deterioration by movement, extending between the relatively movable chassis and body of the automobile.

The reciprocable operating rod 36 that is also described as link 68 parallels, and operates in the same manner as, the conventional steering link which extends from the crank at the lower end of the steering column to the automobile tie rod and which has proved to be practical on account of the absence of side motion between the chassis and body of an automobile as compared with the axial motion that occurs upon change of speed. Through the conventional allowance of "play" or "slack" in the linkage between the valve and the means for actuating the left end of the reciprocable operating rod or link, there is no tendency for the clutch to be accidentally disengaged by motion of the car.

The mechanism is simple and easily installed, and is not likely to get out of order when once properly adjusted. The proper adjustment of the operation of the valve in relation to the movement of the gear-shifting member is easily accomplished. When the system is used in an automobile provided with the usual foot lever for controlling the clutch, as may be easily done by connecting the piston with such lever, there is the advantage that the manual control may be resorted to if through any circumstance the automatic system should become disabled.

From the foregoing it is thought that the construction, operation, and many advantages of the herein described invention will be apparent to those skilled in the art without further description, and it will be understood that changes in the size, shape, proportions and minor details may be resorted to without departing from the spirit of the invention as set forth in the accompanying claims.

I claim:

1. In a power transmission system including change speed gearing, a manual control movable between a neutral position and different positions to select different drives through the gearing, a clutch, a fluid pressure-actuated mechanism for controlling the engagement of the clutch, and a valve controlling the action of said mechanism; means for operating said valve comprising a rotatable crank connected with the manual control and rotated by the movement thereof in moving in either direction between its neutral and drive-selecting positions, and operating means connecting the crank and the valve, and moving the latter to actuate the power operator to engage the clutch substantially simultaneously with the reaching by the manual control of drive-selecting position, and to disengage the clutch substantially simultaneously with the removal of the control from a drive-selecting position.

2. In combination with a gear shift controller for change sped transmissions, said controller being movable between a neutral position and different positions to select different drives through the transmission, a clutch, and a power clutch-operator, a valve for controlling actuation of the clutch-operator, a rotary element connected with and rotated by the manual controller in moving in either direction between its neutral and drive-selecting positions, and valve-operating means connected with the valve and with the rotary element for operating the valve to actuate the clutch-operator to engage the clutch substantially simultaneously with the manual control reaching a drive-establishing position, and to disengage the clutch substantially simultaneously with the removal of said control from a drive-establishing position.

3. The combination of claim 2 wherein the manual control comprises a handle movable along a plurality of paths between its neutral and different drive-selecting positions, and wherein the rotary element comprises a shaft associated with the handle and rotated by its movement as it is moved along the respective paths, said shaft having a crank, and the valve-operating means comprising a link connected with and reciprocated by the crank and connected with the valve for operating the latter in accordance with its reciprocation.

4. The combination of claim 2 wherein the manual control comprises a handle movable along a plurality of paths between its neutral and different drive-selecting positions, the rotary element comprises a shaft connected with and rotated by the handle, and connected with the change speed transmission for selecting drives therethrough according to its position as controlled by the handle, and valve-operating mechanism connected with and operated by the shaft, and so controlling the valve as to actuate the clutch-operator to engage the clutch substan-tially simultaneously with the reaching of a drive-establishing position by the handle and shaft, and to disengage the clutch substantially simultaneously with their removal from such a position.

5. The combination with a change speed transmission having a gear shifting lever that is movable between a neutral position and a plurality of different positions to establish different drives through the transmission, a clutch, and a power clutch-operator, of movably mounted members equal in number to the drive-establishing positions, said members being associated with and movable by the gear shifting lever in moving in either direction between neutral and the respective drive-establishing positions, said members controlling the operation of the clutch-operator.

6. In a transmission system that includes change speed gearing, a gear shifting lever having a neutral position and being movable therefrom to different positions to establish different drives through the gearing, a clutch, and a power clutch-operator for controlling the engagement of the clutch; means for actuating the clutch-operator comprising a plurality of movable members equal in number to the drive-establishing positions of the gear shifting lever and associated with and arranged respectively to be engaged and moved by the gear shifting lever as it is moved to and from the respective drive-establishing positions, means inter-connecting the movable members to transmit motion from one to all of them, said connections being so arranged that the direction of motion imparted to the members by the lever in moving to any drive-establishing position is always the same, and mechanism for controlling the actuation of the clutch-operator, said mechanism being connected with and operated by the movement of the members to actuate the clutch-operator to engage the clutch when the lever is moved to a drive-establishing position and to disengage the clutch when the lever is moved away from such a position.

7. In a power transmission system comprising a change speed transmission, a gear shifting lever connected with the transmission and movable from a neutral position to different drive-establishing positions, a clutch, and a power clutch-operator, means for controlling the actuation of the clutch-operator comprising a plurality of movable members equal in number to the drive-establishing positions of the gear shifting lever, said members being pivotally mounted and extending into the paths travelled by the lever in moving to and from the respective drive-establishing positions and arranged to be engaged and moved by said lever in so travelling, and controlling mechanism for actuating the clutch control, said mechanism being connected with the movable members and controlled by their movement to actuate the clutch-operator to engage the clutch when the gear shift lever has been moved to a drive-establishing position and to disengage the clutch when the lever is moved away from such a position.

8. In a power transmission comprising a clutch, a power operator for the clutch and a change-speed transmission provided with a gear shift lever having a neutral position and being movable from such position along different paths to different drive-establishing positions; means for automatically actuating the power operator for the clutch comprising a plurality of intermeshing gear wheels equal in number to the drive-establishing positions to which the lever may be moved, said wheels respectively being rotatably mounted at the sides of the respective paths of the lever and respectively extending across said paths, each of said gear wheels having a notch in its periphery arranged to receive the lever as it moves toward a drive-establishing position, the wheels and notches being so arranged with relation to the paths of the lever that the former will be turned by the lever as it moves toward and away from the drive-establishing positions, and mechanism for actuating the clutch-operator connected with and operated by the rotation of the gear wheels to actuate the operator to engage the clutch when the lever has reached a drive-establishing position, and to disengage the clutch when it is moved away from such a position.

9. Actuating means for a power clutch-operator in accordance with claim 8, wherein the gear wheels surround the gear shifting lever, the neutral position of which is central with relation to said wheels, and said gear wheels are arranged with their surfaces at substantially right angles to the axis of the lever, each of said gear wheels being provided with a curved operating arm extending beyond the periphery of the wheel from the side of the notch that is toward the neutral position of the lever, said arms being so curved as to be engaged and moved by the lever in travelling toward the neutral position after having left the notch.

10. A controlling element for mounting adjacent and actuation by a transmission gear shift lever in association with other similar elements, said element comprising a gear wheel adapted to be rotatably mounted to one side of and extending across the path of a gear shift lever and having a notch in its periphery for receiving the lever as it is moved toward a drive-establishing position, whereby motion of the lever will impart rotation to the wheel, said wheel having mounted on one of its faces a pair of operating arms that extend from opposite sides of the notch, said arms being oppositely curved away from the notch, whereby one of them may be engaged and moved by a gear shifting lever that has left the notch in moving away from a drive-establishing position, the pairing of said arms permitting mounting of the element in association with other similar elements by placing the arm-bearing surfaces of adjacent elements in upward and downward arrangement.

11. Actuating means for a power clutch-operator in accordance with claim 8, wherein the gear wheels surround the gear shift lever, the neutral position of which is central with relation to said wheels, and said wheels are arranged with their faces at substantially right angles to the axis of the lever, and wherein each of the said gear wheels is provided with a pair of curved guide members that extend beyond the periphery of the wheel at opposite sides of the notch, said guides being curved away from the notch in such fashion that the guide that is disposed toward the central neutral position crosses the path of the lever in moving toward such position from a drive-establishing position, and is engaged by the lever after leaving the notch to impart further motion to the wheel, the adjacent wheels being mounted in reverse arrangement, whereby the guides are disposed upon the upper and lower faces of the alternate wheels, and relatively opposite guides of the adjacent wheels are engageable by the gear shift lever.

12. Clutch-control mechanism in accordance with claim 7, wherein the movable members comprise plates pivotally mounted beside the paths of the lever, said plates having notches arranged to receive the lever as it moves toward the respective drive-establishing positions, whereby the plates are swung by the movement of the lever, and guide members extending from the sides of the notches that are toward the neutral position and arranged to be engaged by the lever after it has moved out of the respective notches toward the neutral position, said plates being connected by connecting rod for transferring to all of them motion imparted by the lever to any one, and wherein the controlling mechanism for actuating the clutch-control is connected with and operated by one of said plates.

13. Actuating means for a power clutch-operator in accordance with claim 8, wherein the gear shift lever and gear wheels are mounted on the steering column of an automobile and extend to one side thereof, the peripheries of the gear wheels are bevelled and said wheels are mounted with their surfaces at obtuse angles to the axis of the gear shift lever, a shaft extends from the axis of one of the wheels to the opposite side of the steering column, clearance being provided by reason of the angular mounting of the wheels, a crank is mounted at the end of the shaft, and the mechanism for actuating the clutch-operator is connected with and controlled by the crank.

14. In an automobile transmission system that includes change speed gearing and a clutch, both mounted upon the chassis of an automobile below the body thereof, in combination: a power clutch-operator comprising a cylinder, a piston reciprocable within the cylinder and connected with the clutch for controlling its engagement, a tubular connection between the cylinder and a source of vacuum, and a valve controlling said tubular connection; a gear shifting handle mounted on the steering column of the automobile adjacent the steering wheel, said handle being movable between a neutral and different positions and connected with the change speed gearing for establishing different drives when moved to its respective positions, a member movably mounted adjacent the handle extending into the path of and movable by the gear shifting handle as the latter is moved in either direction between neutral position and the different drive-establishing positions, a movable rigid link extending along the steering column and connected with the movable member, and mechanism for actuating the valve connected with and operated by the movement of the link and arranged to control the operation of the piston to engage the clutch when the gear shifting handle has been moved to a drive-establishing position and to disengage the clutch when the handle is moved away from such a position.

15. The combination of claim 14 wherein the movable member is rotatable, a crank is associated with the member for rotating therewith, the link is movable longitudinally of the steering column and is reciprocated by the crank, the valve of the clutch-operator is operated by a reciprocable rod, and a bell crank is connected with the link and the reciprocable rod for operating the valve in accordance with the reciprocation of the link by the gear-shifting handle.

16. The combination of claim 14, wherein the movable member is a rotatable gear-shifting rod that extends between and connects the handle and the change speed gearing for shifting said gearing, said rod is provided with a crank, a reciprocable rod is conected with the crank, and said rod is connected with the valve for operating the same.

17. In a power transmission system including change speed gearing, a manual control movable between a neutral position and different positions to select different drives through the gearing, a clutch, and a valve-controlled power operator connected with the clutch for controlling engagement thereof, means for operating the valve that cotnrols the power operator comprising an operating member connected with the valve and the manual control and movable by the latter to operate the valve, said member being so arranged with respect to the manual control as to be moved by it in travelling, in either direction, between its neutral position and a drive-selecting position, and said member being so connected with the valve as to operate the latter to cause the power operator to engage the clutch substantially simultaneously with the reaching by the manual control of a drive-selecting position, and to disengage the clutch substantially simultaneously with the removal of the manual control from a drive-establishing position.

FREDERICK L. WOLFF.